US009002757B2

(12) United States Patent
Kojima

(10) Patent No.: US 9,002,757 B2
(45) Date of Patent: Apr. 7, 2015

(54) PARAMETER SETTING APPARATUS, NON-TRANSITORY MEDIUM STORING COMPUTER PROGRAM, AND PARAMETER SETTING METHOD

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 278 days.

(21) Appl. No.: 13/523,373

(22) Filed: Jun. 14, 2012

(65) Prior Publication Data
US 2013/0031036 A1  Jan. 31, 2013

(30) Foreign Application Priority Data

Jul. 25, 2011  (JP) .................................. 2011-62442

(51) Int. Cl.
G06F 15/18 (2006.01)
H04W 24/02 (2009.01)
G06N 99/00 (2010.01)
H04W 28/16 (2009.01)

(52) U.S. Cl.
CPC ............. G06N 99/005 (2013.01); *H04W 28/16* (2013.01); *H04W 24/02* (2013.01)

(58) Field of Classification Search
CPC .................. G06N 99/05; H04W 24/02; H04W 36/0083–36/165; H04W 28/08–28/16; H04W 84/045–84/18
See application file for complete search history.

(56) References Cited

U.S. PATENT DOCUMENTS

| 8,620,341 B2 * | 12/2013 | Zhu et al. ....................... 455/453 |
| 2005/0041584 A1 * | 2/2005 | Lau et al. ....................... 370/235 |
| 2009/0187641 A1 * | 7/2009 | Li et al. ......................... 709/220 |
| 2010/0302954 A1 * | 12/2010 | Tirpak et al. ................... 370/252 |
| 2010/0309799 A1 | 12/2010 | Nunzi et al. |
| 2011/0092210 A1 * | 4/2011 | Kumar et al. ................. 455/436 |
| 2011/0176424 A1 * | 7/2011 | Yang et al. ................. 370/236.2 |
| 2012/0002567 A1 * | 1/2012 | Sun et al. ....................... 370/252 |
| 2012/0039305 A1 * | 2/2012 | Han et al. ....................... 370/332 |

(Continued)

FOREIGN PATENT DOCUMENTS

| JP | 2-64846 A | 3/1990 |
| JP | 2000-122985 A | 4/2000 |
| JP | 2007-52589 A | 3/2007 |
| JP | 2010-539760 | 12/2010 |

OTHER PUBLICATIONS

Abdullah et al., "Multi-Agent Reinforcement Learning and Self-Organization in a Network of Agents", May 18, 2007, AAMAS, pp. 1-8.*

(Continued)

*Primary Examiner* — Stanley K Hill
*Assistant Examiner* — Paulinho E Smith
(74) *Attorney, Agent, or Firm* — Fujitsu Patent Center

(57) ABSTRACT

A parameter setting apparatus for a control parameter for a wireless communication network including a processor, wherein optimizations for optimizing the control parameter are separated into groups which are unrelated to each other, and the processor executes: a first agent program which are assigned to a group-by-group selects an optimization to be activated according to a first value function; and a second agent program which learns a second value function for determining whether an optimization that affects the first value function is to be activated or not and determines whether the optimization is to be activated or not according to the second value function, and, the activation of the optimization by the first agent program is stopped when the second agent program activates the optimization.

12 Claims, 10 Drawing Sheets

(56) References Cited

U.S. PATENT DOCUMENTS

| | | | |
|---|---|---|---|
| 2012/0195210 A1* | 8/2012 | Grayson | 370/252 |
| 2012/0213057 A1* | 8/2012 | Zhang et al. | 370/216 |
| 2013/0017834 A1* | 1/2013 | Han et al. | 455/437 |
| 2013/0031036 A1* | 1/2013 | Kojima | 706/12 |
| 2013/0040690 A1* | 2/2013 | Lee | 455/522 |
| 2013/0065516 A1* | 3/2013 | Asaoka | 455/25 |
| 2013/0072131 A1* | 3/2013 | Guey et al. | 455/68 |
| 2013/0122885 A1* | 5/2013 | Kojima | 455/418 |
| 2013/0150022 A1* | 6/2013 | Lee et al. | 455/422.1 |
| 2013/0194915 A1* | 8/2013 | Wegmann et al. | 370/228 |
| 2013/0272132 A1* | 10/2013 | Heo et al. | 370/236.2 |
| 2013/0281089 A1* | 10/2013 | Chandrasekhar et al. | 455/434 |
| 2013/0324076 A1* | 12/2013 | Harrang | 455/405 |
| 2013/0331079 A1* | 12/2013 | Racz et al. | 455/418 |
| 2014/0031051 A1* | 1/2014 | Ljung | 455/452.1 |
| 2014/0087739 A1* | 3/2014 | Weaver | 455/441 |
| 2014/0206360 A1* | 7/2014 | Wegmann et al. | 455/440 |

OTHER PUBLICATIONS

Nazim Agoulmine, "Autonomic Network Management Principles", Nov. 17, 2010, Elsevier, pp. 1-288.*

Dirani et al, "A Cooperative Reinforcement Learning Approach for Inter-Cell Interference Coordination in OFDMA Cellular Networks", Jul. 2010, WiOPT 2010, pp. 286-292.*

Li et al., "Self-Optimization of Coverage and Capacity in LTE Networks Based on Central Control and Decentralized Fuzzy Q-Learning", 2012, International Journal of Distributed Sensor Networks, pp. 1-10.*

Lobinger et al., "Coordinating Handover Parameter Optimization and Load Balancing in LTE Self-Optimizing Networks", May 18, 2011, Vehicular Technology Conference (VTC Spring), pp. 1-5.*

4G Americas, "Self-Optimizing Networks in 3GPP Release 11: The Benefits of SON in LTE", Oct. 2013, pp. 1-62.*

Schmelz et al., "SOCRATES D2.4 Framework for the Development of Self-Organisation Methods", Sep. 2008, pp. 1-49.*

Suga et al., "Centralized Mobility Load Balancing Scheme in LTE Systems", Nov. 9, 2011, International Symposium on Wireless Communication Systems, pp. 306-310.*

CMCC; "Way Forward for CCO", 3GPP TSG-RAN WG3 Meeting #65 R3-091695, Aug. 24-28, 2009, Shenzhen, China.

JPOA—Japanese Office Action dated Dec. 16, 2014 for Japanese Application No. 2011-162442, with partial English translation.

* cited by examiner

| STATE s | | | | ACTION a | Q(s, a) |
|---|---|---|---|---|---|
| STATE CONSTITUENT ELEMENT 1 | STATE CONSTITUENT ELEMENT 2 | STATE CONSTITUENT ELEMENT 3 | ····· | | |
| 1a | 2a | 3a | | ac1 | 1 |
| 1a | 2a | 3a | | ac2 | 0.5 |
| 1a | 2a | 3b | | ac1 | 0.1 |
| ····· | ····· | ····· | ····· | ····· | ····· |

# PARAMETER SETTING APPARATUS, NON-TRANSITORY MEDIUM STORING COMPUTER PROGRAM, AND PARAMETER SETTING METHOD

CROSS-REFERENCE TO RELATED APPLICATIONS

This application is based upon and claims the benefit of priority of the prior Japanese Patent Application No. 2011-162442, filed on Jul. 25, 2011, the entire contents of which are incorporated herein by reference.

FIELD

The embodiments discussed herein are related to the setting of control parameters for a wireless communication network.

BACKGROUND

The adoption of SON (Self-Organizing Network) is being considered for automated optimization of control parameters used to control various pieces of equipment in a wireless communication network. One example of wireless communication standards considering the use of SON is LTE (Long Term Evolution) on which 3GPP (Third Generation Partnership Project) is working for standardization.

On the other hand, it is known to provide, as an optimization algorithm, reinforcement learning which is one form of machine learning. In reinforcement learning, an agent learns from interaction with its environment by referring to the state variables of the environment, and improves the policy so as to maximize the total amount of reward that it finally receives.

An agent learning machine is known which learns based on its environment and which performs actions on the environment based on the results of the learning. The agent learning machine includes: an environment abstracting means for observing the state of the environment in the form an observed variable through an observation function, and for abstracting the environment from a continuous state to a discrete state; a state determining means for determining an index for specifying one state that best abstracts the environment at the current time from among the discrete states after the abstraction by the environment abstracting means; an action determining means for determining an index for specifying one action to be taken by learning in the one discrete state determined by the state determining means; a low-order reward selecting means for selecting, as a low-order reward, one low-order reward function having the index determined by the state determining means and the index determined by the action determining means, from among a plurality of low-order reward functions which are continuous functions; and a control output determining means for determining a control output to the environment in such a manner as to maximize the low-order reward function selected by the low-order reward selecting means, and for performing an action on the environment by using the control output.

There is also known an access prediction method which predicts the number of accesses by using a layered neural network that is constructed from an input layer, an intermediate layer, and an output layer, each having one or more units, and that provides weights for connections between the layers. According to this method, each unit value of the neural network at the time that the current number of accesses is predicted is calculated using the past number of accesses, each connection weight of the neural network is updated so that the prediction of accesses a plurality of cycles ahead can be made from the current number of accesses, and the number of accesses the plurality of cycles ahead is predicted from the current number of accesses by using the neural network having the thus obtained unit values and connection weights.

It is also known to provide a learning process supervising apparatus for use with a network configuration data processing apparatus. The data processing apparatus forms a layered network using basic units each of which receives one or a plurality of inputs from a preceding layer together with a connection weight by which to multiply each input and produces a sum of products, the value of the sum of products then being converted by a threshold function to provide a final output, wherein the layered network is constructed by forming an input layer with a plurality of basic units, one or a plurality of stages of intermediate layers each with a plurality of basic units, and an output layer with one or a plurality of basic units, and wherein internal connections are formed between the input layer and the intermediate layer at the first stage, between each intermediate layer, and between the intermediate layer in the final stage and the output layer, and the weight is set in corresponding relationship to each internal connection. The data processing apparatus includes an output signal deriving means for supplying a plurality of prescribed input signals to the basic inputs at the input layer and thereby deriving an output signal corresponding to the input signals from the basic unit at the output layer, an error calculating means for taking as inputs the output signal of each layer unit obtained by the output signal deriving means and a teacher signal specifying a value to be taken by an output signal held in a learning pattern holding unit and for calculating an error value representing the degree of mismatching between the two signals, and a weight learning means for performing processing so that a weight value is obtained such that the sum of the error values falls within predetermined tolerance by sequentially updating the connection weight from an initial value in accordance with an amount by which to update the weight based on the sum of the error values calculated by the error calculating means.

Related art is disclosed in Japanese Laid-open Patent Publications No. 2007-52589 and No. 2000-122985, and Japanese Patent No. 2732603.

SUMMARY

According to one aspect of an apparatus, there is provided a parameter setting apparatus for setting a control parameter for a wireless communication network in response to a state variable of the wireless communication network. The parameter setting apparatus includes a processor which, through reinforcement learning, learns which of a plurality of optimizations, each for optimizing the control parameter, is to be executed to optimize the control parameter. The optimizations form a group of optimizations that affect the same state variable used to determine a value function of reinforcement learning or a group of optimizations whose control parameters overlap each other. The processor executes: a process in which a first agent program allocated on a group-by-group basis learns, through reinforcement learning, a first value function for determining which of the optimizations in the group is to be executed; a process in which the first agent program, using the first value function and based on the state of the wireless communication network, determines which of the optimizations in the group is to be executed, and activates the determined optimization; a process in which a second agent program learns, through reinforcement learning, a second value function for determining whether, among the optimizations for optimizing the control parameters of the wireless communication network, an optimization that affects the first value function is to be executed or not; a process in which the second agent program, using the second value function and based on the state of the wireless communication network, determines whether the optimization that affects the first value function is to be executed or not and, depending on a result of the determination, activates the optimization; and a process in which, when the second agent program activates the optimization, the activation of the determined optimization by the first agent program is stopped.

According to one aspect of a non-transitory medium, there is provided a computer-readable, non-transitory medium storing a computer program for setting a control parameter for a wireless communication network in response to a state variable of the wireless communication network. The computer program causes a computer to execute a process which, through reinforcement learning, learns which of a plurality of optimizations, each for optimizing the control parameter, is to be executed to optimize the control parameter. The optimizations form a group of optimizations that affect the same state variable used to determine a value function of reinforcement learning or a group of optimizations whose control parameters overlap each other. The computer program causes the computer to execute: a process in which a first agent program allocated on a group-by-group basis learns, through reinforcement learning, a first value function for determining which of the optimizations in the group is to be executed; a process in which the first agent program, using the first value function and based on the state of the wireless communication network, determines which of the optimizations in the group is to be executed, and activates the determined optimization; a process in which a second agent program learns, through reinforcement learning, a second value function for determining whether, among the optimizations for optimizing the control parameters of the wireless communication network, an optimization that affects the first value function is to be executed or not; a process in which the second agent program, using the second value function and based on the state of the wireless communication network, determines whether the optimization that affects the first value function is to be executed or not and, depending on a result of the determination, activates the optimization; and a process in which, when the second agent program activates the optimization, the activation of the determined optimization by the first agent program is stopped.

According to one aspect of a method, there is provided a parameter setting method for setting a control parameter for a wireless communication network in response to a state variable of the wireless communication network. The parameter setting method organizes a plurality of optimizations, each for optimizing the control parameter, form a group of optimizations that affect the same state variable used to determine a value function of reinforcement learning that is performed to learn which of the plurality of optimizations is to be executed to optimize the control parameter, or into a group of optimizations whose control parameters overlap each other. The parameter setting method causes a computer to execute: a process in which a first agent program allocated on a group-by-group basis learns, through reinforcement learning, a first value function for determining which of the optimizations in the group is to be executed; a process in which the first agent program, using the first value function and based on the state of the wireless communication network, determines which of the optimizations in the group is to be executed, and activates the determined optimization; a process in which a second agent program learns, through reinforcement learning, a second value function for determining whether, among the optimizations for optimizing the control parameters of the wireless communication network, an optimization that affects the first value function is to be executed or not; a process in which the second agent program, using the second value function and based on the state of the wireless communication network, determines whether the optimization that affects the first value function is to be executed or not and, depending on a result of the determination, activates the optimization; and a process in which, when the second agent program activates the optimization, the activation of the determined optimization by the first agent program is stopped.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

1. Hardware Configuration

Figure 1:
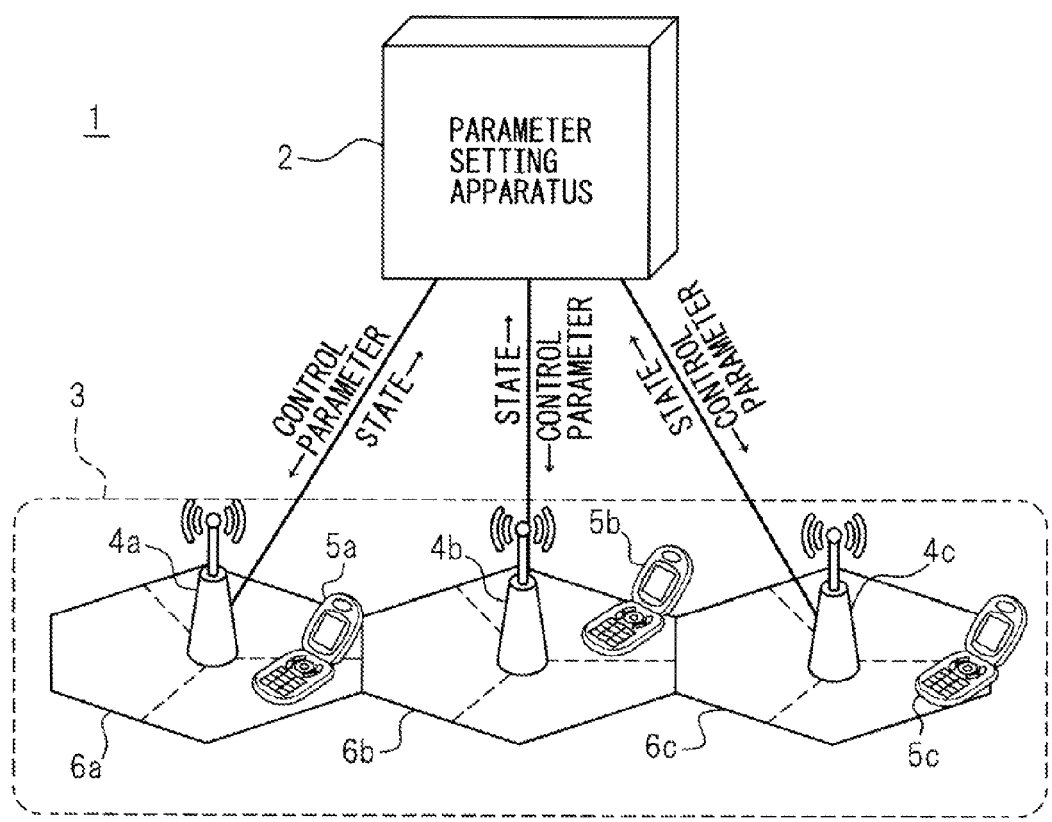
FIG. 1 is a diagram illustrating an example of the general configuration of a communication system.

Embodiments will be described below with reference to the accompanying drawings. FIG. 1 is a diagram illustrating an example of the general configuration of a communication system. The communication system 1 includes a parameter setting apparatus 2 and a wireless communication network 3. The wireless communication network 3 includes base station apparatuses 4a to 4c and mobile station apparatuses 5a to 5c. Reference numerals 6a to 6c indicate the cells covered by the respective base stations 4a to 4c. In the following description, the base station apparatuses and mobile station apparatuses may be referred to as the base stations and mobile stations, respectively. Further, in the following description, the base stations 4a to 4c, mobile stations 5a to 5c, and cells 6a to 6c may be collectively referred to as the "base station 4", "mobile station 5", and "cell 6", respectively.

The parameter setting apparatus 2 collects the state of the wireless communication network 3 from the base station 4 and mobile station 5, and optimizes control parameters for controlling the base station 4 and mobile station 5 in accordance with the state of the wireless communication network 3. To collect the state of the wireless communication network 3 and to transmit the control parameters, the parameter setting apparatus 2 may be connected to the base station 4 via a wired network. The parameter setting apparatus 2 includes a plurality of SON applications as control means for automatically optimizing the control parameters. Further, the parameter setting apparatus 2 includes a SON controller which selects an appropriate SON application for operation in accordance with the state of the wireless communication network 3.

Figure 2:
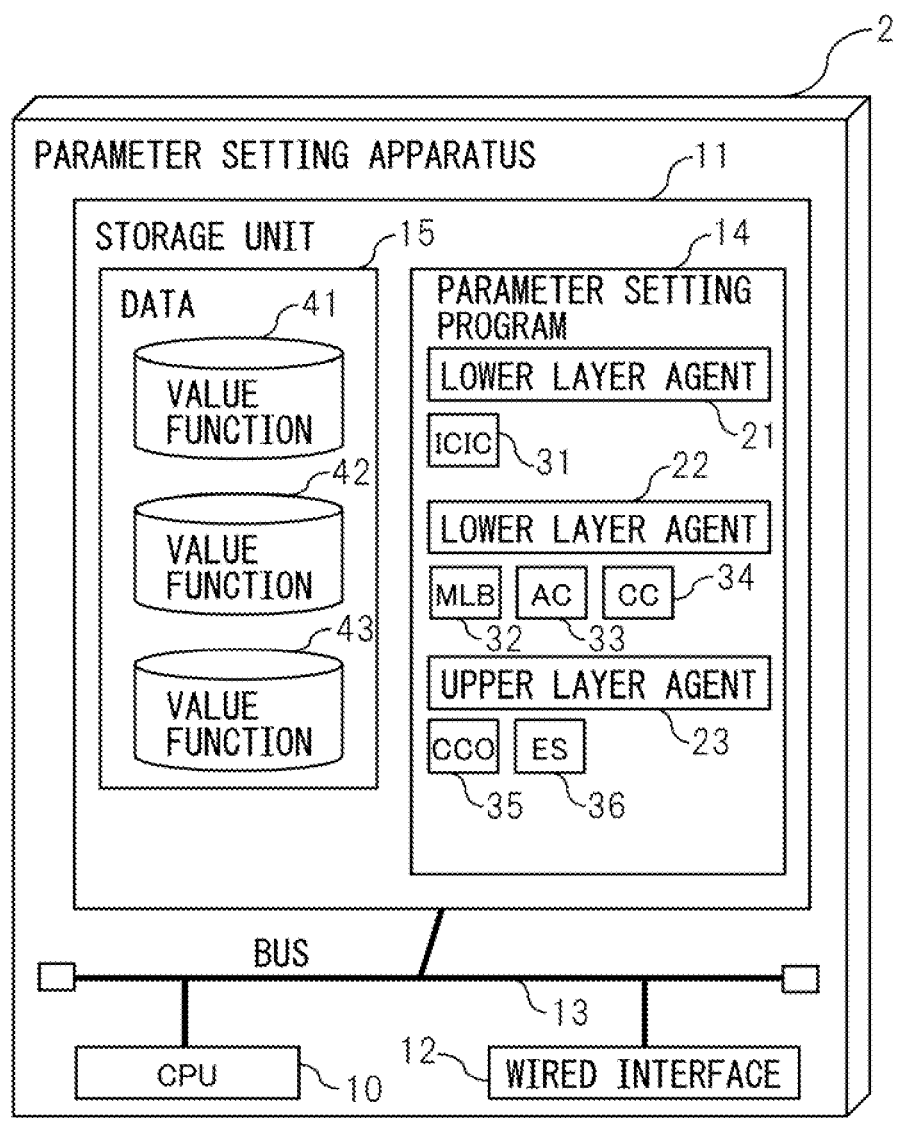
FIG. 2 is a diagram illustrating one example of the hardware configuration of a parameter setting apparatus.

Next, the configuration of the parameter setting apparatus 2 will be described. FIG. 2 is a diagram illustrating one example of the hardware configuration of the parameter setting apparatus 2. The parameter setting apparatus 2 is a computer that contains a CPU 10, a storage unit 11, and a wired interface 12. It is to be noted that the hardware configuration depicted in FIG. 2 is only one configuration example for realizing the parameter setting apparatus 2. Any other suitable hardware configuration may be employed as long as it can implement the processing to be described later in this specification.

The storage unit 11 stores a parameter setting program 14 and data 15. The storage unit 11 may include a storage device such as a random access memory (RAM), a read only memory (ROM), a nonvolatile memory, or a hard disk. By executing the parameter setting program 14 stored in the storage unit 11, the CPU 10 carries out the processing to be described later for setting the control parameters. The wired interface 12 performs processing for communication with the base station 4. The CPU 10, the storage unit 11, and the wired interface 12 are interconnected by a bus 13.

The parameter setting apparatus 2 may be equipped with a removable media reader for reading data recorded on computer-readable removable recording media. The removable media reader may be, for example, a CD-ROM drive, a DVD-ROM drive, a flexible disk drive, a CD-R drive, a DVD-R drive, an MO drive, or an access unit for accessing a flash memory device. In a certain embodiment, the parameter setting program 14 may be stored and distributed on a computer-readable removable recording medium and may be loaded into the storage unit 11 using the removable media reader.

In an alternative embodiment, the parameter setting apparatus 2 may be equipped with a network interface for transferring programs and various kinds of data to and from a network such as a local area network (LAN) or the Internet. The parameter setting program 14 may be loaded into the storage unit 11 via the network interface.

The parameter setting program 14 contains a first lower layer agent program 21, a second lower layer agent program 22, an upper layer agent program 23, and SON application programs 31 to 36. The lower layer agent programs 21 and 22 together are an example of a first agent program, and the upper layer agent program 23 is an example of a second agent program. In the following description and the accompanying drawings, each agent program may be referred to as an "agent".

The SON application programs 31 to 36 together are a computer program, executed by the CPU 10, for causing the parameter setting apparatus 2 to function as a SON application for automatically optimizing the control parameters. Unless specifically described otherwise, in the following description and the accompanying drawings, each "SON application program" will be referred to as a "SON application".

The SON application 31 carries out ICIC (Inter Cell Interference Coordination) optimization. The SON application 31 adjusts the interval at which to collect interference information and optimizes radio resource allocation between edge and center. The ICIC optimization concerns the optimization of interference between the cells 6.

The SON application 32 carries out MLB (Mobility Load Balance) for optimizing handover parameters in each cell. The SON application 33 carries out AC (Admission Control) optimization for optimizing a call admission threshold. The SON application 34 carries out CC (Congestion Control) optimization for optimizing a congestion control threshold based on which to determine whether any ongoing call is to be forcefully disconnected or not. The MLB, the AC optimization, and the CC optimization each concern the optimization of load distribution between the cells 6.

The SON application 35 carries out CCO (Coverage and Capacity Optimization) for optimizing the antenna tilt and azimuth setting and the transmit power of the base station 4. The SON application 36 carries out ES (Energy Saving) for optimizing the power-on and power-off of the radio transmitter of the cell 6. CCO and ES are optimizations that affect the interference and load distribution between the cells 6.

The above-enumerated processing examples of the SON applications 31 to 36 are examples of the optimizations performed to optimize the control parameters of the wireless communication network 3. The parameter setting apparatus 2 may further include SON applications that carries out other optimizations. For example, the parameter setting apparatus 2 may include SON applications that carry out MRO (Mobility Robustness Optimization) and LLR (Link Level Retransmission scheme). The parameter setting apparatus 2 may further include, for example, a SON application that carries out TAO (Tracking Areas Optimization).

The agents 21 to 23 cause the parameter setting apparatus 2 to act as a SON controller. The SON controller performs control to activate or not activate the SON applications 31 to 36 according to the state of the wireless communication network 3, and activates an appropriate one of the SON applications by selecting it from among the SON applications 31 to 36.

The agents 21 to 23 learn through reinforcement learning whether or not to activate any one of the SON applications and which of the SON applications is to be activated according to the state of the wireless communication network 3. Value functions 41 to 43 to be used in reinforcement learning are stored as the data 15 in the storage unit 11. For a better understanding of the embodiment, reinforcement learning will be described below.

2. Description of Reinforcement Learning

Figures 3, 4:
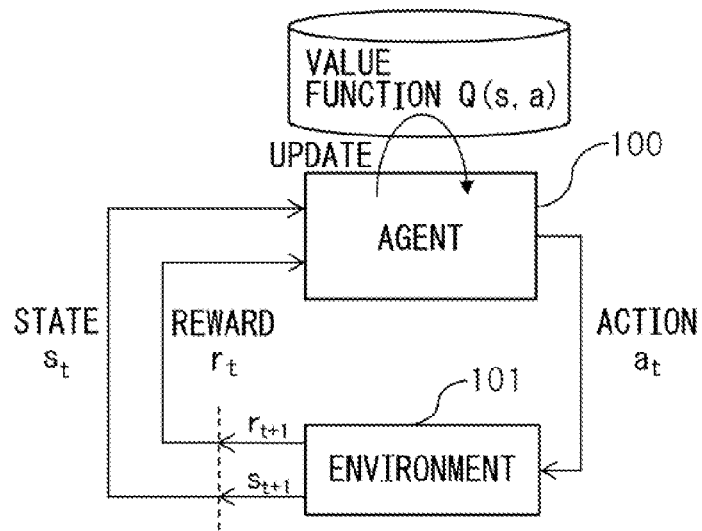
FIG. 3 is a diagram illustrating a reinforcement learning model.
FIG. 4 is a diagram illustrating one example of a value function.

FIG. 3 is a diagram illustrating a reinforcement learning model. As earlier described, reinforcement learning is a process in which an agent 100 learns from interaction with an environment 101 and improves the policy so as to maximize the total amount of reward $r_t$ that it finally receives. An example of such reinforcement learning is Q-learning. The agent 100 learns in the following steps (1) and (2).

(1) The agent 100 selects an action $a_t$ to be taken at time t in accordance with the state $s_t$ of the environment 101.

At this time, using a value function $Q(s, a)$, the agent 100 preferentially selects, with a certain probability, the action $a_t$ that maximizes the reward in the case of the state $s_t$. An example of the value function $Q(s, a)$ is depicted in FIG. 4. The value function $Q(s, a)$ indicates an action value when a given action "a" is performed in a given state "s". In the example of FIG. 4, when the values of the state constituent elements 1, 2, and 3 constituting the state $s_t$ are "1a", "2a", and "3a", respectively, the action value for performing an action "ac2" is "0.5".

When the state constituent elements 1, 2, and 3 of the state "s" are "1a", "2a", and "3a", respectively, the action that yields the highest action value is "ac1". For example, when an ε-greedy policy is employed, the probability of selecting the highest value action "ac1" is defined as "1−ε+ε/|A(s)|", and the probability of selecting the other action "ac2" is defined as "ε/|A(s)|". The value "ε" is a set value given as 0≤ε≤1, while the value |A(s)| represents the number of possible actions that the agent 100 can select in the state "s". In the case of FIG. 4, the number of possible actions that can be selected is two, i.e., "ac1" and "ac2".

(2) As a result of the action $a_t$ of the agent 100, the environment makes a state transition to $s_{t+1}$, and the reward $r_t$ corresponding to that transition is given to the agent 100. The agent 100 updates the value function Q(s, a) according to the reward $r_t$. This improves the policy derived from the value function. For example, the agent 100 may update Q(s, a) in accordance with the following mathematical expression. Set values "α" and "γ" are the "learning rate" and "discount rate", respectively.

$$Q(s_t, a_t) \leftarrow Q(s_t, a_t) + \alpha \left[ r_t + \gamma \max_{a'} Q(s_{t+1}, a') - Q(s_t, a_t) \right]$$

A value function other than the function depicted in the table form in FIG. 4 may also be used. For example, in an alternative embodiment, a function that calculates the value by a mathematical expression having the state "s", action "a", and coefficients α1, α2, ..., may be used as the value function Q(s, a). In this case, the agent 100 updates the coefficients α1, α2, ..., according to the reward $r_t$. Further, in an alternative embodiment, some other policy may be employed instead of the ε-greedy policy. For example, a softmax policy may be employed.

3. First Embodiment

Figure 5:
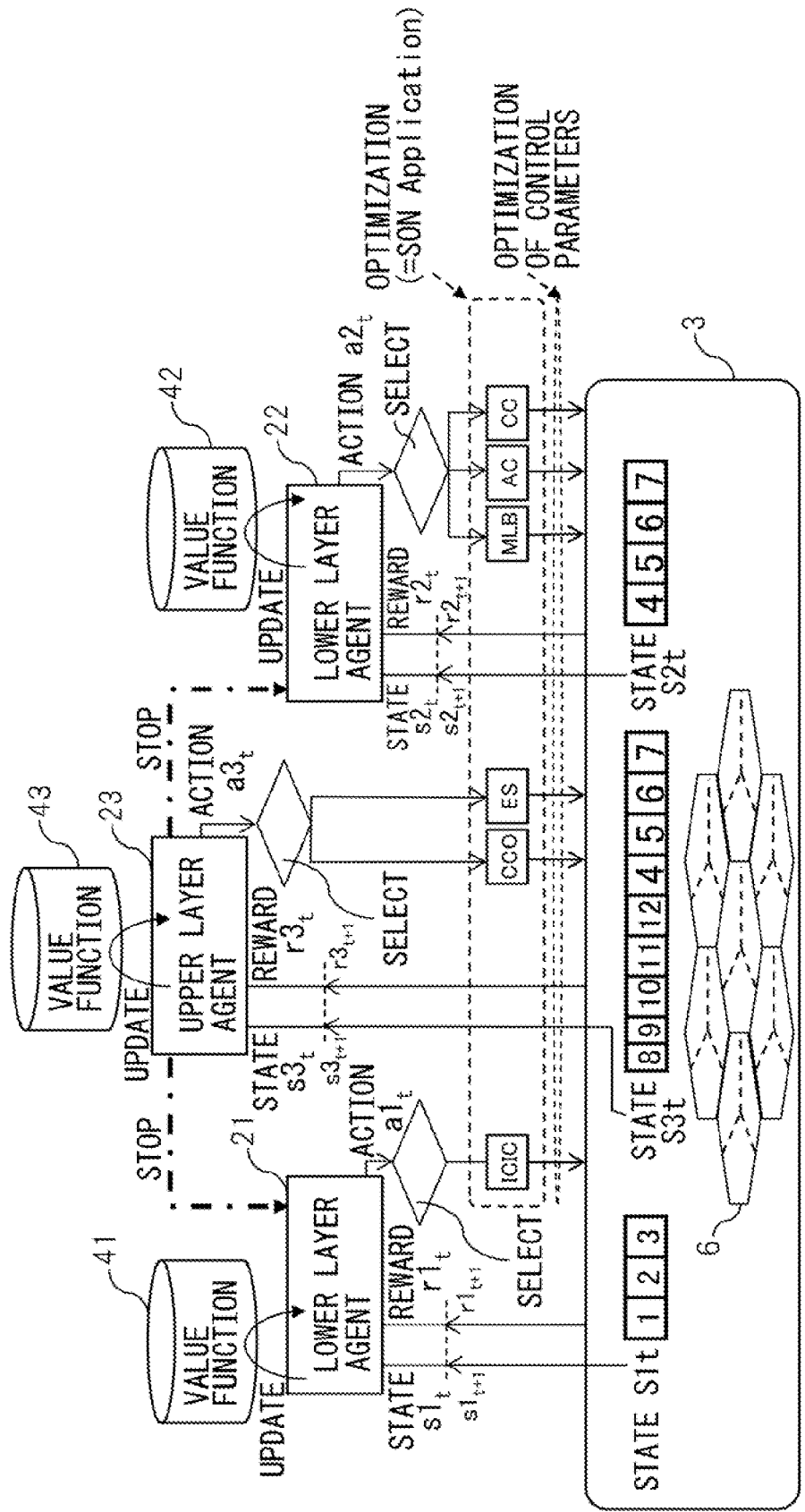
FIG. 5 is a diagram illustrating a first embodiment of state variables and optimizations.

Next, a description will be given of embodiments in which reinforcement learning is adopted for setting the control parameters. FIG. 5 is a diagram illustrating a first embodiment in which reinforcement learning is adopted for setting the control parameters.

When applying the reinforcement learning to the SON controller, the agents 21 to 23 each receive the state of the wireless communication network 3 as the "state" of the "environment", select one of the optimizations that the plurality of SON applications carry out, and output the selected optimization as the "action". The state of the wireless communication network 3 to be input to each of the agents 21 to 23 may be given as a combination of a plurality of state variables representing the states of the wireless communication network 3 as seen from a plurality of different perspectives. When the state variables of the wireless communication network 3 are used to represent the state of the wireless communication network 3 in reinforcement learning, the state variables may be referred to as the "state constituent elements". In a certain embodiment, the state of the wireless communication network 3 is represented by a combination of values obtained by discretizing a plurality of state constituent elements.

Further, the agents 21 to 23 each determine the "reward" by the state variables of the wireless communication network 3.

In a certain embodiment, the values of the state variables of the wireless communication network 3 are calculated by weighting and scalarizing them. When the state variables are used to form the reward in reinforcement learning, the state variables may be referred to as the "reward constituent elements".

In the present embodiment, the first lower layer agent 21 takes as input the state $s1_t$ of the wireless communication network 3 at time t, and outputs an action $a1_t$ for the state $s1_t$ in accordance with the value function 41. When the wireless communication network 3 makes a state transition to $s1_{t+1}$ as a result of the action $a1_t$, the value function 41 is updated based on the state $s1_{t+1}$ and on the reward $r1_t$ corresponding to the state transition.

The optimization selected as the action $a1_t$ is the ICIC optimization that concerns the optimization of inter-cell interference. The first lower layer agent 21 determines whether or not to execute the ICIC optimization as the action $a1_t$. The ICIC collects inter-cell interference information, decides to which radio resource, the one allocated to the cell edge or the one allocated to the cell center, the call is to be allocated, and allocates the call to the radio resource according to the result of the decision. The control parameters to be optimized by the ICIC optimization are the collection interval of the inter-cell interference information and the radio resource allocation between cell edge and cell center.

The state constituent elements constituting the state $s1_t$ are: (1) cell-edge throughput, (2) cell-edge packet transfer efficiency, and (3) cell-edge interference level. The reward constituent element of the reward $r1_t$ is the cell throughput. The parenthesized numbers prefixed to the above state constituent elements correspond to the numbers placed in boxes alongside the state $s1_t$ in FIG. 5. The same applies to the other states $s2_t$ and $s3_t$, and the same convention is also used in other embodiments.

One example of the expected learning effect expected to be achieved by the reinforcement learning of the first lower layer agent 21 is given below. For example, when the cell-edge throughput and the cell-edge packet transfer efficiency are both low, and the cell-edge interference level is high, the first lower layer agent 21 activates the ICIC optimization by determining that the interval at which the interference information is collected is too long. Therefore, the interval is adjusted so that the information is collected at shorter intervals of time; as a result, the interference is reduced, and a higher cell throughput is obtained as the reward. As can be seen from this example of the expected learning effect, (1) cell-edge throughput, (2) cell-edge packet transfer efficiency, and (3) cell-edge interference level are the state constituent elements necessary for determining whether or not to activate the ICIC optimization.

The above expected learning effect is one example, and the causal relationship that exists between the state $s1_t$, the selected action $a1_t$, and the resulting reward $r1_t$ is not limited to the above particular example. The first lower layer agent 21 can train the optimization so that a higher value can be obtained under a given state by the reinforcement learning, including the case where a learning effect occurs due to an unpredicted causal relationship. The same applies to the expected learning effect described hereinafter of the reinforcement learning of each of the other agents 22 and 23.

The second lower layer agent 22 takes as input the state $s2_t$ of the wireless communication network 3 at time t, and outputs an action $a2_t$ for the state $s2_t$ in accordance with the value function 42. When the wireless communication network 3 makes a state transition to $s2_{t+1}$ as a result of the action $a2_t$, the value function 42 is updated based on the state $s2_{t+1}$ and on the reward $r2_t$ corresponding to the state transition.

The optimizations selected as the action $a2_t$ include the MLB, the AC optimization, and the CC optimization each of which concerns the optimization of load distribution between the cells 6. The second lower layer agent 22 determines whether or not to execute any one of the MLB, AC, and CC optimizations as the action $a2_t$ and, if any one of them is to be executed, then selects the optimization to be executed.

The MLB achieves load distribution between the cells by optimizing a handover parameter as a control parameter. By adjusting the handover parameter, the MLB makes it easy or difficult for a mobile station to makes a handover to a given cell. The control parameter optimized by the MLB is thus the handover parameter.

The AC is a process in which, if the load of the cell increases up to the call admission threshold, a new call is not accepted, prohibiting the allocation of radio resources to the new call. The AC optimization optimizes the call admission threshold which is a control parameter for the AC. The control parameter optimized by the AC optimization is thus the call admission threshold.

The CC is a process in which, if the load of the cell increases up to a level that causes a congestion state, ongoing calls are forcefully disconnected in ascending priority order. The CC optimization optimizes the congestion control threshold which is a control parameter for the CC. That is, the control parameter optimized by the CC optimization is the congestion control threshold based on which to determine whether any ongoing call is to be forcefully disconnected or not. In this way, the control parameters optimized by the MLB, AC, and CC optimizations, respectively, do not contend with each other.

The state constituent elements constituting the state $s2_t$ are: (4) call connection success rate, (5) call loss rate, (6) radio resource usage rate, and (7) adjacent cell radio resource usage rate. The reward constituent elements used for the calculation of the reward $r2_t$ are the call connection success rate, call loss rate, and radio resource usage rate. The second lower layer agent 22 calculates the reward $r2_t$ by weighting and scalarizing these reward constituent elements. The weighting scalarization here refers to a method in which the plurality of reward constituent elements are first weighted, for example, by weighting coefficients W1 to W3, as illustrated below, and are then converted into scalar values.

Reward $r2_t = W1 \times$(Call Connection Success Rate)+ $W2 \times$(1−Call Loss Rate)+$W3 \times$(1−Radio Resource Usage Rate)

One example of the expected learning effect expected to be achieved by the reinforcement learning of the second lower layer agent 22 is given below. For example, when the radio resource usage rate is high, and the adjacent cell radio resource usage rate is low, the second lower layer agent 22 activates the MLB, aiming to reduce the load by distributing the load between the cells. As a result, the radio resource usage rate is reduced, and a higher reward is achieved.

Further, for example, when the call connection success rate is bad, the call loss rate is excessively good, and the radio resource usage rate is not high, the second lower layer agent 22 activates the AC optimization by determining that the cell 6 is excessively rejecting new calls. Therefore, the call admission threshold is adjusted so as to make it easier for the cell 6 to accept new cells; this improves the call connection success rate, and achieves a higher reward.

On the other hand, for example, when the call connection success rate and the call loss rate are both bad, and the radio resource usage rate is not high, the second lower layer agent 22 activates the CC optimization by determining that a congestion state is detected when the load of the cell 6 is not so high. Therefore, the congestion control threshold is adjusted, and as a result, the call connection success rate and the call loss rate both improve, thus achieving a higher reward.

As can be seen from the above example of the expected learning effect, (4) call connection success rate, (5) call loss rate, (6) radio resource usage rate, and (7) adjacent cell radio resource usage rate are the state constituent elements necessary for determining which of the MLB, AC, and CC optimizations is to be activated.

A description will be given of the relationship between the optimization activated by the first lower layer agent 21 and the optimization activated by the second lower layer agent 22. The control parameters to be optimized by the ICIC optimization activated by the first lower layer agent 21 are the collection interval of the inter-cell interference information and the radio resource allocation between cell edge and cell center. On the other hand, the control parameters to be optimized by the MLB, AC, and CC optimizations activated by the second lower layer agent 22 are the handover parameter, the call admission threshold, and the congestion control threshold. Accordingly, the control parameters to be optimized by the ICIC optimization and the control parameters to be optimized by the MLB, AC, and CC optimizations do not contend with each other.

In the case of the reinforcement learning process that selects the ICIC optimization as the action, the cell throughput which is a measure of the inter-cell interference is used as the reward constituent element. On the other hand, in the case of the reinforcement learning process that selects the MLB, AC, and CC optimizations as the actions, the call connection success rate, the call loss rate, and the radio resource usage rate, each of which is a measure of the load of the cell 6, are used as the reward constituent elements. In this way, between the reinforcement learning process that selects the ICIC optimization as the action and the reinforcement learning process that selects the MLB, AC, and CC optimizations as the actions, the result of the optimization selected in one reinforcement learning process does not affect any reward constituent element used in the other reinforcement learning process. Accordingly, the first lower layer agent 21 can execute the ICIC optimization independently of the optimization executed by the second lower layer agent 22.

On the other hand, the control parameters to be optimized by the MLB, AC, and CC optimizations activated by the second lower layer agent 22 are the handover parameter, the call admission threshold, and the congestion control threshold, but these parameters do not contend with each other.

However, the reward constituent elements used in the reinforcement learning process that selects the MLB, AC, and CC optimizations are each a measure of the load of the cell 6, and any of these constituent elements is affected by any one of the results of the MLB, AC, and CC optimizations. Accordingly, each value function used for the selection of the MLB, AC, and CC optimizations has the common property that the value function is learned based on the reward that varies with the load of the cell 6. As a result, the result of any one of these optimizations affects the learning of the value function used for the selection of other optimizations.

Accordingly, if two or more of the MLB, AC, and CC optimizations are executed concurrently, the result of one optimization affects the value function used for the selection of the other optimization, and an error occurs in the learning of the action value. In view of this, in the present embodiment, the MLB, AC, and CC optimizations are organized into the same group, and the second lower layer agent 22 selects one of these optimizations as the action of the reinforcement learning and executes the selected optimization.

Next, the optimization process to be activated by the upper layer agent 23 will be described. The upper layer agent 23 takes as input the state $s3_t$ of the wireless communication network 3 at time t, and outputs an action $a3_t$ for the state $s3_t$ in accordance with the value function 43. When the wireless communication network 3 makes a state transition to $s3_{t+1}$ as a result of the action $a3_t$, the value function 43 is updated based on the state $s3_{t+1}$ and on the reward $r3_t$ corresponding to the state transition.

The optimizations selected as the action $a3_t$ include CCO and ES which concern the optimization of the interference and load distribution between the cells 6. The upper layer agent 23 determines whether or not to execute any one of the CCO and ES optimizations as the action $a3_t$ and, if one or the other of them is to be executed, then selects the optimization to be executed.

The CCO aims to minimize the inter-cell interference and distribute the load between the cells by optimizing the antenna setting, such as tilt and azimuth, and the transmit power and thereby optimizing the cell coverage as the optimization target. Thus, the control parameters optimized by the CCO are the antenna setting, such as tilt and azimuth, and the transmit power.

The ES aims to save system power by turning off power to the radio transmitter of the cell when the load of the cell is relatively low and by turning on power to the radio transmitter of the cell when the load of the cell is relatively high. Thus, the control parameter optimized by the ES is the power-on and power-off of the radio transmitter of the cell.

The state constituent elements constituting the state $s3_t$ are: (8) cell throughput, (9) cell average packet transfer efficiency, (10) cell average interference level, (11) mobile station distribution, (12) energy saving mode, (4) call connection success rate, (5) call loss rate, (6) radio resource usage rate, and (7) adjacent cell radio resource usage rate. The reward constituent elements used for the calculation of the reward $r3_t$ are the cell throughput, call connection success rate, call loss rate, and radio resource usage rate.

One example of the expected learning effect expected to be achieved by the reinforcement learning of the upper layer agent 23 is given below. For example, consider the situation where the energy saving mode is OFF, i.e., power is not turned off to the transmitter of a given cell 6 for power saving; in this situation, suppose that the call connection success rate and the call loss rate are both bad, the radio resource usage rate is high, the adjacent cell radio resource usage rate is low, and mobile stations are distributed evenly across the cell. In this case, the upper layer agent 23 activates the CCO, adjusts the antenna setting and the transmit power, and varies the cell coverage, aiming to distribute the load between the cells and to reduce the load of the cell. This improves the call connection success rate and the call loss rate and reduces the radio resource usage rate, and as a result, a higher reward can be obtained.

On the other hand, when the energy saving mode is ON, for example, if the call connection success rate and the call loss rate are both bad, and the radio resource usage rate is high, then the upper layer agent 23 activates the ES to turn on power to the radio transmitter that was turned off. This improves the call connection success rate and the call loss rate and reduces the radio resource usage rate, and as a result, a higher reward can be obtained.

Further, consider, for example, the situation where the cell throughput and the cell packet transfer efficiency are both bad not only at the cell edge but also over the entire cell, and the cell interference level is high. In this case, it is not possible to reduce the interference by the ICIC optimization, but it is possible to reduce the interference by the CCO by varying the coverages of a plurality of cells. If the interference is reduced, a higher cell throughput can be obtained as the reward. Therefore, when the cell throughput and the cell packet transfer efficiency are both bad not only at the cell edge but also over the entire cell, and the cell interference level is high, the upper layer agent 23 activates the CCO. As a result, the antenna setting and the transmit power are adjusted, and the cell coverage varies, hence reducing the inter-cell interference. This improves the cell throughput and achieves a higher reward.

As can be seen from the above example of the expected learning effect, (8) cell throughput, (9) cell average packet transfer efficiency, (10) cell average interference level, (11) mobile station distribution, (12) energy saving mode, (4) call connection success rate, (5) call loss rate, (6) radio resource usage rate, and (7) adjacent cell radio resource usage rate are the state constituent elements necessary for determining which of the CCO and ES optimizations is to be activated.

A description will be given of the relationship between the optimization process activated by each of the first and second lower layer agent 21 and 22 and the optimization process activated by the upper layer agent 23. The CCO and ES are optimizations that involve varying the cell coverage which is the most fundamental parameter for the state of the mobile network. When the cell coverage is varied, the inter-cell interference and the cell load state also vary.

In the learning of the value function 41 used by the first lower layer agent 21, the cell throughput is used as the reward, and in the learning of the value function 42 used by the second lower layer agent 22, the reward that varies with the load is used. Accordingly, if the upper layer agent 23 is operated simultaneously with the lower layer agents 21 and 22, the optimization process performed by the upper layer agent 23 affects the action values of the value functions 41 and 42, and an error occurs in the learning of the value functions 41 and 42. In view of this, in the embodiment disclosed herein, when the upper layer agent 23 activates the optimization process, the upper layer agent 23 performs control so as to cause the operation of the lower layer agents 21 and 22 to stop.

Figure 6:
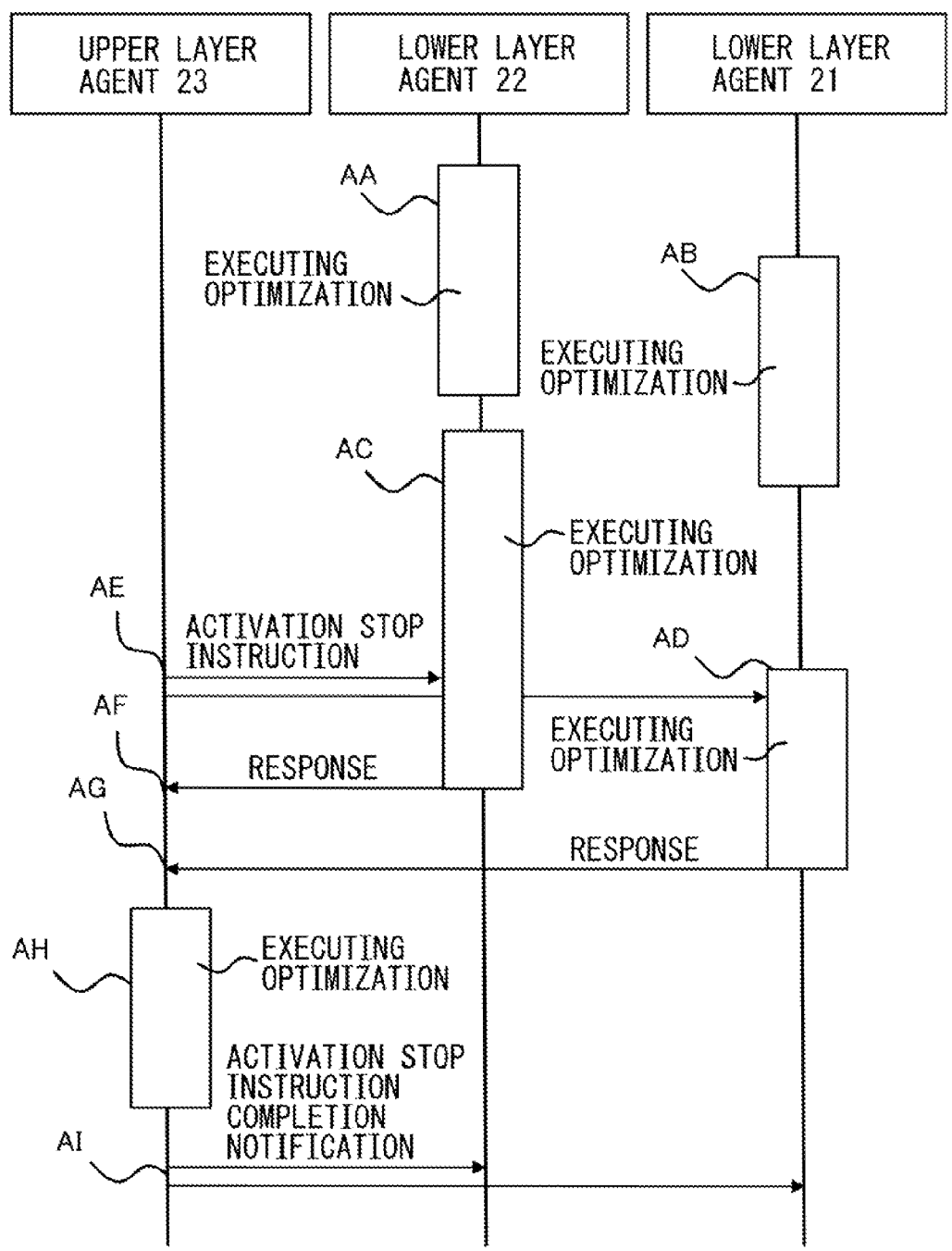
FIG. 6 is a sequence diagram illustrating the process performed by each agent.

Next, the process performed by each of the agents 21 to 23 will be described. FIG. 6 is a sequence diagram illustrating the process performed by each of the agents 21 to 23. In an alternative embodiment, the following operations may be called the "steps". In operation AA, the second lower layer agent 22 activates one of the MLB, AC, and CC optimizations. The optimization processing time taken to complete the optimization process may differ for each optimization.

In operation AB, the first lower layer agent 21 activates the ICIC optimization. In operation AC, the second lower layer agent 22 activates the next optimization as the optimization activated in operation AA is completed. In operation AD, the first lower layer agent 21 activates the next optimization.

In operation AE, in order to activate one or the other of the CCO and ES optimizations, the upper layer agent 23 sends an optimization activation stop instruction to the lower layer agents 21 and 22. The lower layer agents 21 and 22 are unable to immediately stop the currently executing optimization processes upon reception of the activation stop instruction.

In operation AF, when the currently executing optimization is terminated, the second lower layer agent 22 sends the upper layer agent 23 a response notifying it of the termination of the optimization in response to the activation stop instruction. Likewise, in operation AG, when the currently executing optimization is terminated, the first lower layer agent 21 sends the upper layer agent 23 a response notifying it of the termination of the optimization in response to the activation stop instruction. When the responses from both of the lower layer agents 21 and 22 are received, the upper layer agent 23 in operation AH activates one or the other of the CCO and ES optimizations.

In a certain embodiment, the lower layer agents 21 and 22 may not need to respond to the activation stop instruction. In this case, assuming that the optimization that takes the longest time to process is in progress at one or the other of the lower layer agents, the upper layer agent 23 waits for that length of time and then initiates its optimization process. However, in the embodiment in which the lower layer agents 21 and 22 respond to the activation stop instruction, the upper layer agent 23 can initiate its optimization process earlier than otherwise by reducing the length of time that it has to wait until the lower layer agents terminate their optimization processes.

In operation AI, the upper layer agent 23 sends an activation stop instruction completion notification to the lower layer agents 21 and 22. Thereupon, the lower layer agents 21 and 22 resumes the activation of their optimization processes.

Figure 7:
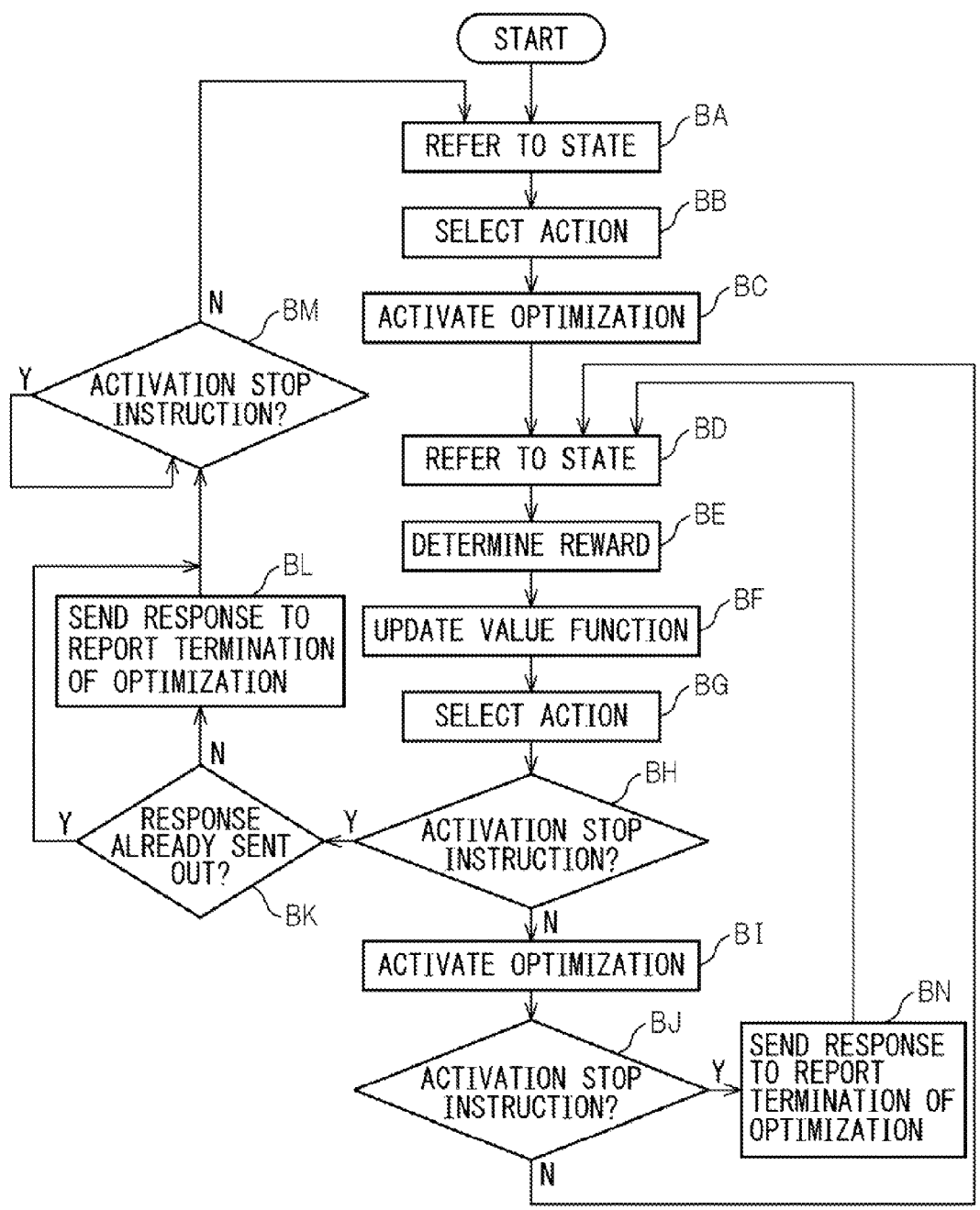
FIG. 7 is a diagram illustrating one example of the process performed by a lower layer agent.

FIG. 7 is a diagram illustrating one example of the process performed by the first lower layer agent 21. The following description deals with the process performed by the first lower layer agent 21, but the same description also applies to the process performed by the second lower layer agent 22.

In operation BA, the first lower layer agent 21 refers to the state $s1_t$ of the wireless communication network 3. In operation BB, the first lower layer agent 21 selects the action $a1_t$ by referring to the value function 41, based on the state $s1_t$ referred to in operation BA.

If the execution of the ICIC optimization is selected as the action $a1_t$, the first lower layer agent 21 activates the ICIC optimization in operation BC. In operation BD, the first lower layer agent 21 refers to the state $s1_{t+1}$ of the wireless communication network 3 obtained as a result of the optimization. In operation BE, the first lower layer agent 21 determines the reward $r1_t$.

In operation BF, the first lower layer agent 21 updates the value function 41 based on the reward $r1_t$ and on the current value of the value function 41. In operation BG, the first lower layer agent 21 selects the action $a1_{t+1}$ by referring to the value function 41, based on the state $s1_{t+1}$ referred to in operation BD.

In operation BH, before activating the optimization process once again, the first lower layer agent 21 checks to see whether an activation stop instruction has been issued from the upper layer agent 23 during the process from operations BA to BG. If the instruction has been issued (Y in operation BH), the process proceeds to operation BK. If the instruction is not issued (N in operation BH), the process proceeds to operation BI.

If the execution of the ICIC optimization is selected as the action $a1_{t+1}$, the first lower layer agent 21 activates the ICIC optimization in operation BI. In operation BJ, the first lower layer agent 21 checks to see whether an activation stop instruction has been issued from the upper layer agent 23 during the execution of the ICIC optimization. If the instruction has been issued (Y in operation BJ), the process proceeds to operation BN. If the instruction is not issued (N in operation BJ), the process returns to operation BD.

In operation BN, since the activation stop instruction has been issued from the upper layer agent 23, and since the optimization is not in the process of execution, the first lower layer agent 21 sends the upper layer agent 23 a response notifying it of the termination of the optimization. After that, the process returns to operation BD.

After operation BN, if the activation stop instruction completion notification has not been received from the upper layer agent 23, the first lower layer agent 21 determines in operation BH that the activation stop instruction is in effect (Y in operation BH). As a result, the process proceeds to operation BK. In operation BK, the first lower layer agent 21 checks to see if a response to the effect that the optimization has been terminated has already been sent out.

If the response to the effect that the optimization has been terminated has already been sent out (Y in operation BK), the process proceeds to operation BM. If the response is not yet sent out (N in operation BK), the process proceeds to operation BL. In operation BL, since the optimization is not in the process of execution, the first lower layer agent 21 sends a response to the effect that the optimization has been terminated. After that, the process proceeds to operation BM. In operation BM, the first lower layer agent 21 waits until the activation stop instruction completion notification is received. When the first lower layer agent 21 receives the instruction completion notification, the process returns to operation BA.

Figure 8:
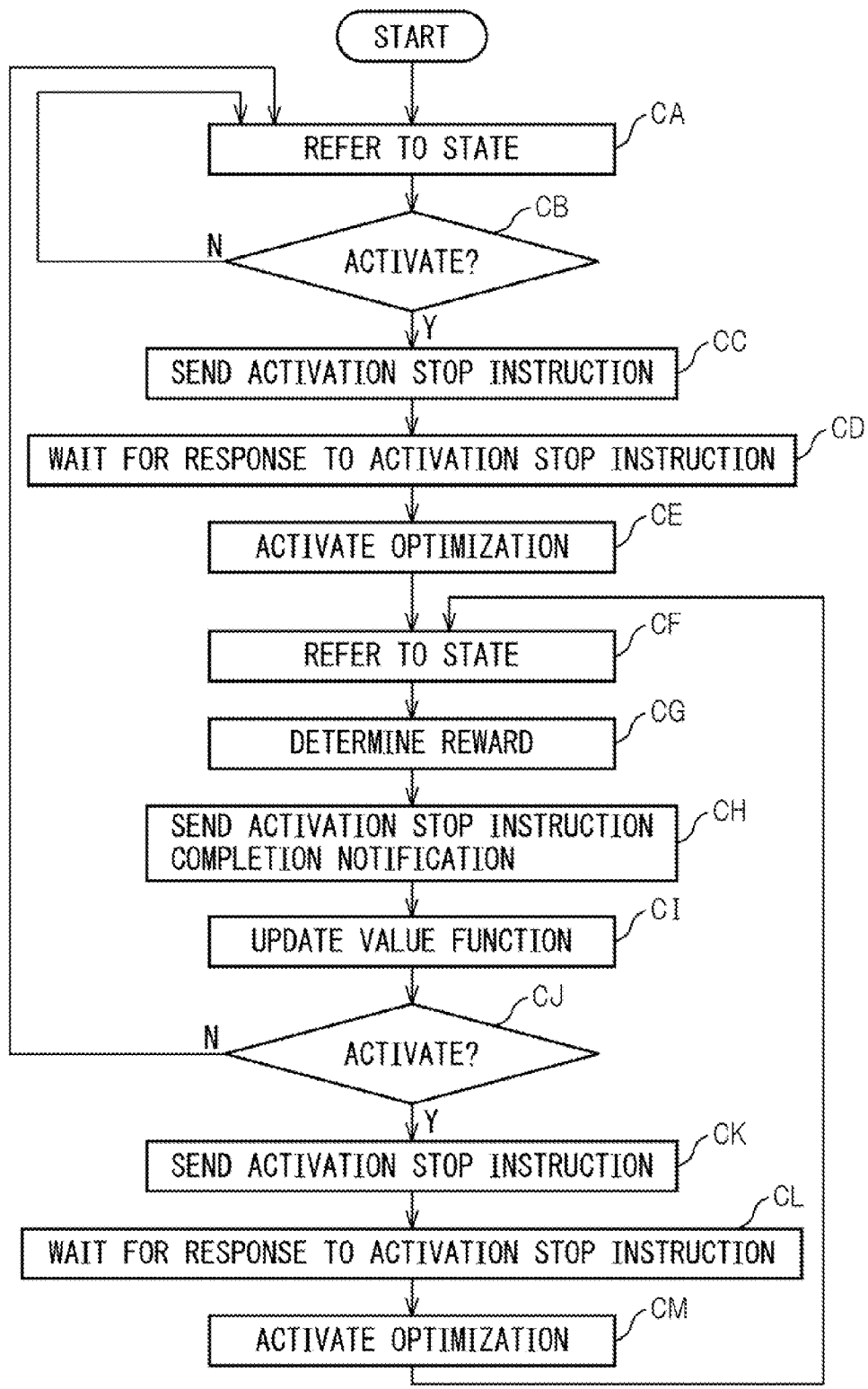
FIG. 8 is a diagram illustrating one example of the process performed by an upper layer agent.

FIG. 8 is a diagram illustrating one example of the process performed by the upper layer agent 23. In operation CA, the upper layer agent 23 refers to the state $s3_t$. In operation CB, the upper layer agent 23 selects the action $a3_t$ by referring to the value function 43, based on the state $s3_t$ referred to in operation CA. If the state $s3_t$ referred to is not so bad as to activate the optimization process, the optimization process may not be activated to implement the action $a3_t$. Therefore, when the state $s3_t$ is referred to, it does not always follow that the upper layer agent 23 sends an activation stop instruction to the lower layer agents 21 and 22 in order to activate the optimization process.

When the upper layer agent 23 activates the optimization process (Y in operation CB), the process proceeds to operation CC. On the other hand, when the upper layer agent 23 does not activate the optimization process (N in operation CB), the process returns to operation CA. In operation CC, the upper layer agent 23 sends an activation stop instruction to the lower layer agents 21 and 22 in order to activate the optimization selected as the action $a3_t$.

In operation CD, the upper layer agent 23 waits until it receives the responses from both of the lower layer agents 21 and 22 in response to the activation stop instruction. When the responses from both of the lower layer agents 21 and 22 are received, the upper layer agent 23 activates the optimization in operation CE. When the optimization is completed, the process proceeds to operation CF.

In operation CF, the upper layer agent 23 refers to the state $s3_{t+1}$. In operation CG, the upper layer agent 23 determines the reward $r3_t$. In operation CH, the upper layer agent 23 sends an activation stop instruction completion notification to the lower layer agents 21 and 22. In operation CI, the upper layer agent 23 updates the value function 43 based on the reward $r3_t$ and on the current value of the value function 43.

In operation CJ, the upper layer agent 23 selects the action $a3_{t+1}$ by referring to the value function 43, based on the state $s3_{t+1}$ referred to in operation CF. If it is determined not to activate the optimization process to implement the action $a3_{t+1}$ (N in operation CJ), the process returns to operation CA. If it is determined to activate one of the optimizations to implement the action $a3_{t+1}$ (Y in operation CJ), the process proceeds to operation CK. The process of operations CK to CM is the same as the process of operations CC to CE. After that, the process returns to operation CF.

In the present embodiment, a plurality of groups are formed from a plurality of optimizations, and the lower layer agents 21 and 22 are allocated on a group-by-group basis. The lower layer agents 21 and 22 each select the optimization to be executed from the allocated group by reinforcement learning. This serves to improve the learning efficiency of the value function, since, of the state constituent elements of the wireless communication network 3, each of the lower layer agents 21 and 22 need only refer to the state constituent elements necessary for determining which of the optimizations in the allocated group is to be selected.

More specifically, as can be seen from the value function Q(s, a) depicted in FIG. 4, as the number of state constituent elements increases, the number of table entries increases. In reinforcement learning, the agent does not always select the action with the highest value, but also tries other actions with relatively low probabilities. This strategy is referred to as "exploration", but if the number of state constituent elements to be referred to is large, the learning efficiency worsens because the number of choices to be explored increases. The present embodiment improves the learning efficiency of the value function by reducing the number of state constituent elements to be referred to in the selection of the optimization.

Further, in the present embodiment, the optimizations are organized into groups each consisting of optimizations whose control parameters overlap each other or optimizations that affect the same reward constituent elements used to determine the value function of reinforcement learning. By thus forming the groups, the control parameters to be optimized by the optimizations belonging to different groups do not contend with each other, and the result of one optimization does not affect the learning of the value function used for the selection of the other optimization. Accordingly, the plurality of lower layer agents 21 and 22 that select the optimizations from the different groups can execute the respective optimizations independently of each other. Since the plurality of optimizations can be executed concurrently in this way, the respective control parameters can be optimized in a shorter time.

Furthermore, in the present embodiment, the upper layer agent 23 activates the optimization that affects the learning of the value functions performed in the plurality of lower layer agents 21 and 22. When the optimizations activated by the lower layer agents 21 and 22 are in the process of execution, the upper layer agent 23 does not activate its optimization process. Conversely, when the optimization activated by the upper layer agent 23 is in the process of execution, the lower layer agents 21 and 22 do not activate their optimization processes.

Accordingly, even when there is an optimization that affects the learning of the value functions performed in the plurality of lower layer agents 21 and 22, the lower layer agents 21 and 22 can be prevented from erroneously learning due to the activation of such optimization. Further, since the plurality of lower layer agents 21 and 22 are allowed to activate their optimizations concurrently during the period that the optimization in question is not in the process of execution, faster optimization of the control parameters can be achieved.

The parameter setting apparatus 2 of the present embodiment has a two-layer structure made up of the lower layer agents 21 and 22 and the upper layer agent 23. However, the agent structure may be formed in three or more layers, as long as the structure is such that the optimization activated by an upper agent affects the value function that a lower agent learns.

Further, in the present embodiment, each of the lower layer agents 21 and 22, upon termination of the currently executing optimization, sends a response to the effect that the optimization has been terminated in response to the activation stop instruction received from the upper layer agent 23. On the other hand, in an embodiment in which the lower layer agents 21 and 22 do not send such responses, the upper layer agent 23 assumes that the lower layer agent 21 or 22 is executing the optimization that takes the longest time to process, and waits for that length of time before it initiates its optimization process. Accordingly, by making provisions so that the lower layer agents 21 and 22 send their responses, the upper layer agent 23 can initiate its optimization process earlier than otherwise by reducing the length of time that it has to wait until the lower layer agents terminate their optimization processes.

4. Second Embodiment

Figure 9:
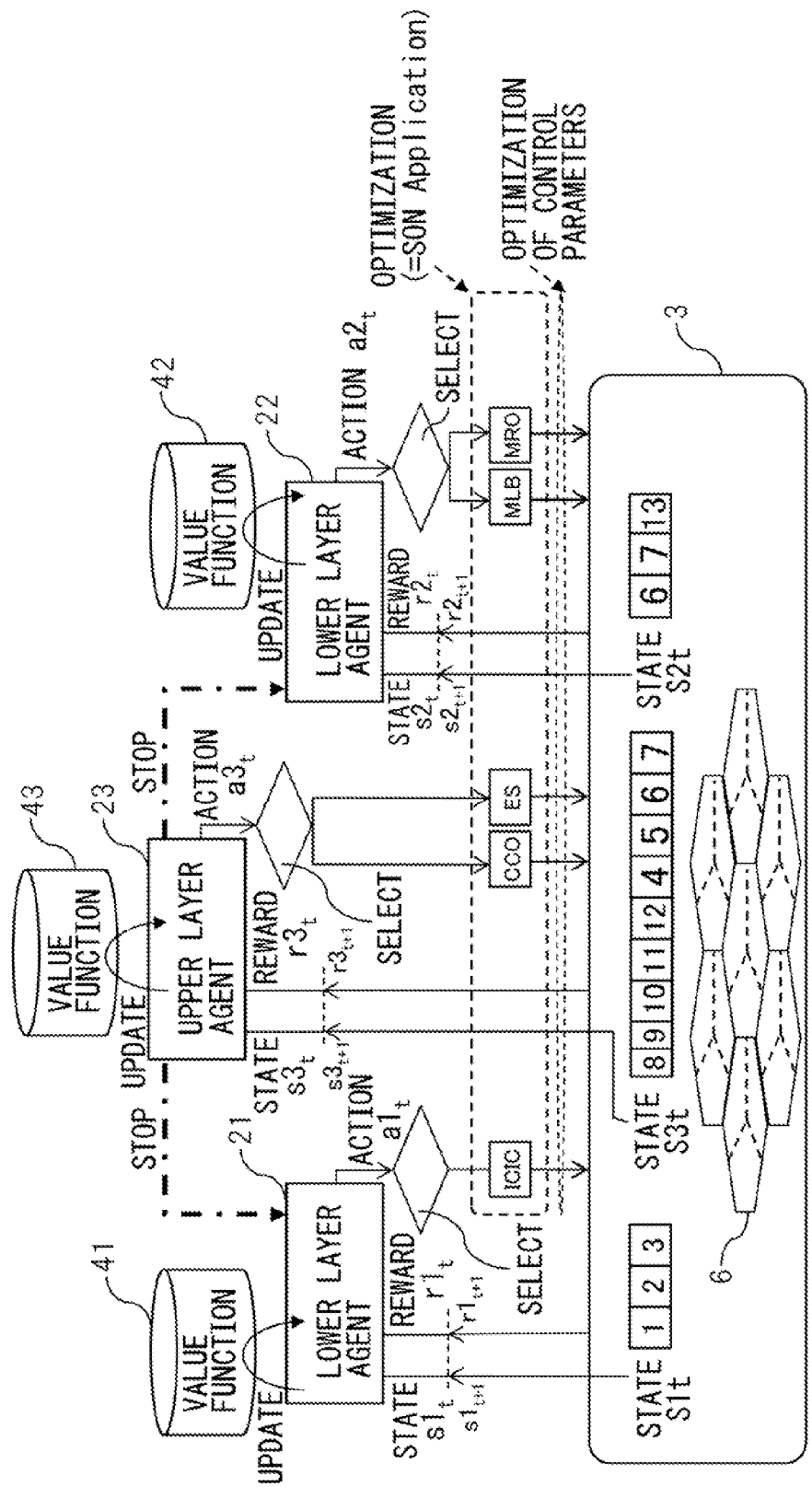
FIG. 9 is a diagram illustrating a second embodiment of state variables and optimizations.

Next, another embodiment will be described. FIG. 9 is a diagram of a second embodiment illustrating the optimizations selected by the agents 21 to 23. In this embodiment, the optimizations that the second lower layer agent 22 selects as the action $a2_t$ are MLB and MRO. The second lower layer agent 22 determines whether or not to execute any one of the MLB and MRO optimizations as the action $a2_t$ and, if one or the other of them is to be executed, then selects the optimization to be executed. The first lower layer agent 21 and the upper layer agent 23 are identical in configuration to those depicted in the first embodiment.

The MRO improves the inter-cell handover success rate by optimizing the handover parameter which is a control parameter. Examples of handover failures are too-early handover and too-late handover. By adjusting the handover parameter, it becomes possible to make it easy or difficult for a mobile station to make a handover to a given cell. The details of MLB have already been described.

The state constituent elements constituting the state $s2_t$ are: (6) radio resource usage rate, (7) adjacent cell radio resource usage rate, and (13) handover success rate. The reward constituent elements used for the calculation of the reward $r2_t$ are the radio resource usage rate and the handover success rate.

One example of the expected learning effect expected to be achieved by the reinforcement learning of the second lower layer agent 22 is given below. For example, when the radio resource usage rate is high, the adjacent cell radio resource usage rate is low, and the handover success rate is high, the second lower layer agent 22 activates the MLB, aiming to reduce the load by distributing the load between the cells. As a result, the radio resource usage rate is reduced, and a higher reward is achieved.

On the other hand, when the handover success rate is low, the lower layer agent 22 activates the MRO, aiming to improve the handover success rate. A handover failure greatly affects the communication quality of the mobile station, since the ongoing call is momentarily disconnected when the mobile station fails to hand over the call. For example, the call may be interrupted in the middle of voice communication. Accordingly, when the handover success rate is low, the first priority is to improve the handover success rate, and therefore, control is performed to optimize the handover parameter. Further, in order for such optimization to be learned, the weighting coefficient of the handover success rate is set larger than that of the other reward constituent element, i.e., the radio resource usage rate. In this case, if the radio resource usage rate is reduced, a higher reward can be achieved by increasing the handover success rate.

As can be seen from the above example of the expected learning effect, (6) radio resource usage rate, (7) adjacent cell radio resource usage rate, and (13) handover success rate are the state constituent elements necessary for determining which of the MLB and MRO optimizations is to be activated.

Since the MLB and MRO both concern the optimization of the handover parameter as the control parameter, if these are to be executed concurrently, the control target contends between them. On the other hand, the control parameters to be optimized by the ICIC optimization activated by the first lower layer agent 21 are the collection interval of the inter-cell interference information and the radio resource allocation between cell edge and cell center, and do not contend with the control parameters to be optimized by the MLB and MRO.

Accordingly, in the present embodiment, the MLB and MRO are organized into the same group. The second lower layer agent 22 selects one of these optimizations as the action of the reinforcement learning and executes the selected optimization. Further, in the present embodiment, the group formed by the ICIC optimization is organized as a group that is different from the group to which the MLB and MRO belong. The first lower layer agent 21 determines whether or not to execute the ICIC optimization as the action of the reinforcement learning.

According to the present embodiment, in the reinforcement learning that carries out the MLB and MRO, the number of state constituent elements necessary for the reinforcement learning can be reduced since the MLB and MRO can be executed independently of other optimizations.

5. Third Embodiment

Figure 10:
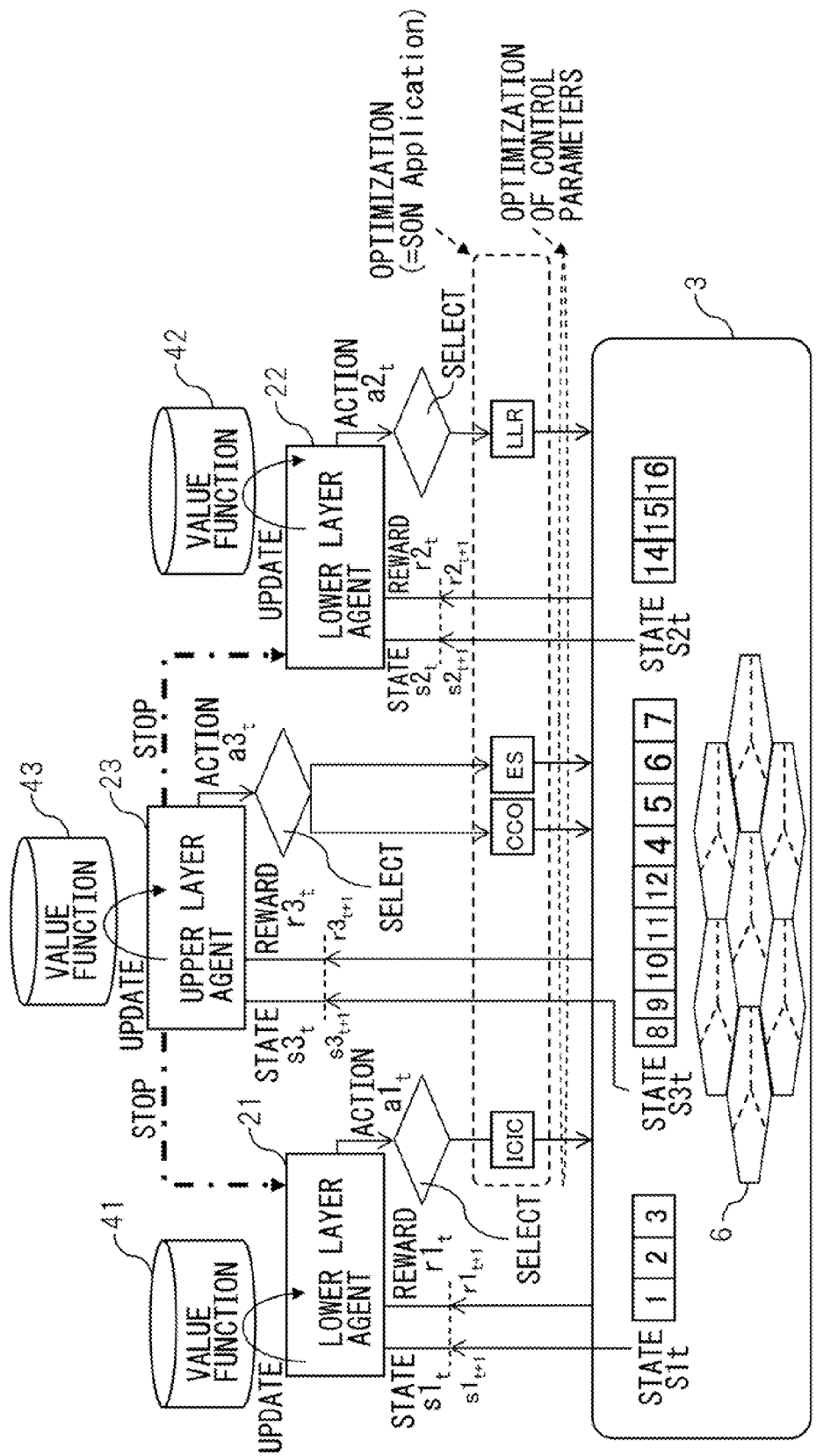
FIG. 10 is a diagram illustrating a third embodiment of state variables and optimizations.

Next, another embodiment will be described. FIG. 10 is a diagram of a third embodiment illustrating the optimizations selected by the agents 21 to 23. In this embodiment, the optimization that the second lower layer agent 22 selects as the action $a2_t$ is LLR. The second lower layer agent 22 determines whether or not to execute the LLR as the action $a2_t$. The first lower layer agent 21 and the upper layer agent 23 are identical in configuration to those depicted in the first embodiment.

The control parameter to be optimized by the LLR that the second lower layer agent 22 executes does not contend with the control parameter to be optimized by the ICIC optimization that the first lower layer agent 21 executes. Then, between the reinforcement learning process that selects the ICIC optimization as the action and the reinforcement learning process that selects the LLR as the action, the result of the optimization selected in one reinforcement learning process does not affect any reward constituent element used in the other reinforcement learning process. Accordingly, in the present embodiment, the LLR forms a group different from the group formed by the ICIC optimization.

The LLR optimizes the maximum number of wireless frame retransmissions, aiming to improve the data transfer success rate while reducing data transfer delay. As the number of wireless frame retransmissions increases, the data transfer success rate improves, but instead, the data transfer delay tends to increase correspondingly. The LLR optimizes the maximum number of retransmissions so as to maximize the data transfer success rate, while reducing the data transfer delay, by referring to the data transfer delay, the average number of retransmissions, and the data transfer success rate. The control parameter optimized by the LLR is thus the maximum number of retransmissions.

The state constituent elements constituting the state $s2_t$ are: (14) data transfer delay, (15) average number of retransmissions, and (16) data transfer success rate. The reward constituent elements used for the calculation of the reward $r2_t$ are the data transfer delay and the data transfer success rate.

On the other hand, the CCO and ES to be executed by the upper layer agent 23 are optimizations that involve varying the cell coverage which is the most fundamental parameter for the state of the mobile network. When the cell coverage is varied, the data transfer delay and the data transfer success rate also vary; in this way, the CCO and ES also affect the retransmission control.

One example of the expected learning effect expected to be achieved by the reinforcement learning of the second lower layer agent 22 is given below. When the data transfer delay and the average number of retransmissions are both small, and the data transfer success rate is low, the second lower layer agent 22 activates the LLR. Since, in this case, the LLR performs control to increase the maximum number of retransmissions, the data transfer delay and the data transfer success rate both improve, and as a result, a higher reward can be achieved. Further, when the data transfer success rate is high, the average number of retransmissions is large, and the data transfer delay is large, the second lower layer agent 22 activates the LLR. Since, in this case, the LLR performs control to reduce the maximum number of retransmissions, the data transfer delay and the data transfer success rate both improve. As a result, a higher reward can be achieved.

As can be seen from the above example of the expected learning effect, (14) data transfer delay, (15) average number of retransmissions, and (16) data transfer success rate are the state constituent elements necessary for determining whether or not to activate the LLR.

According to the present embodiment, in the reinforcement learning that carries out the LLR, the number of state constituent elements necessary for the reinforcement learning can be reduced since the LLR can be executed independently of other optimizations.

6. Fourth Embodiment

Figure 11:
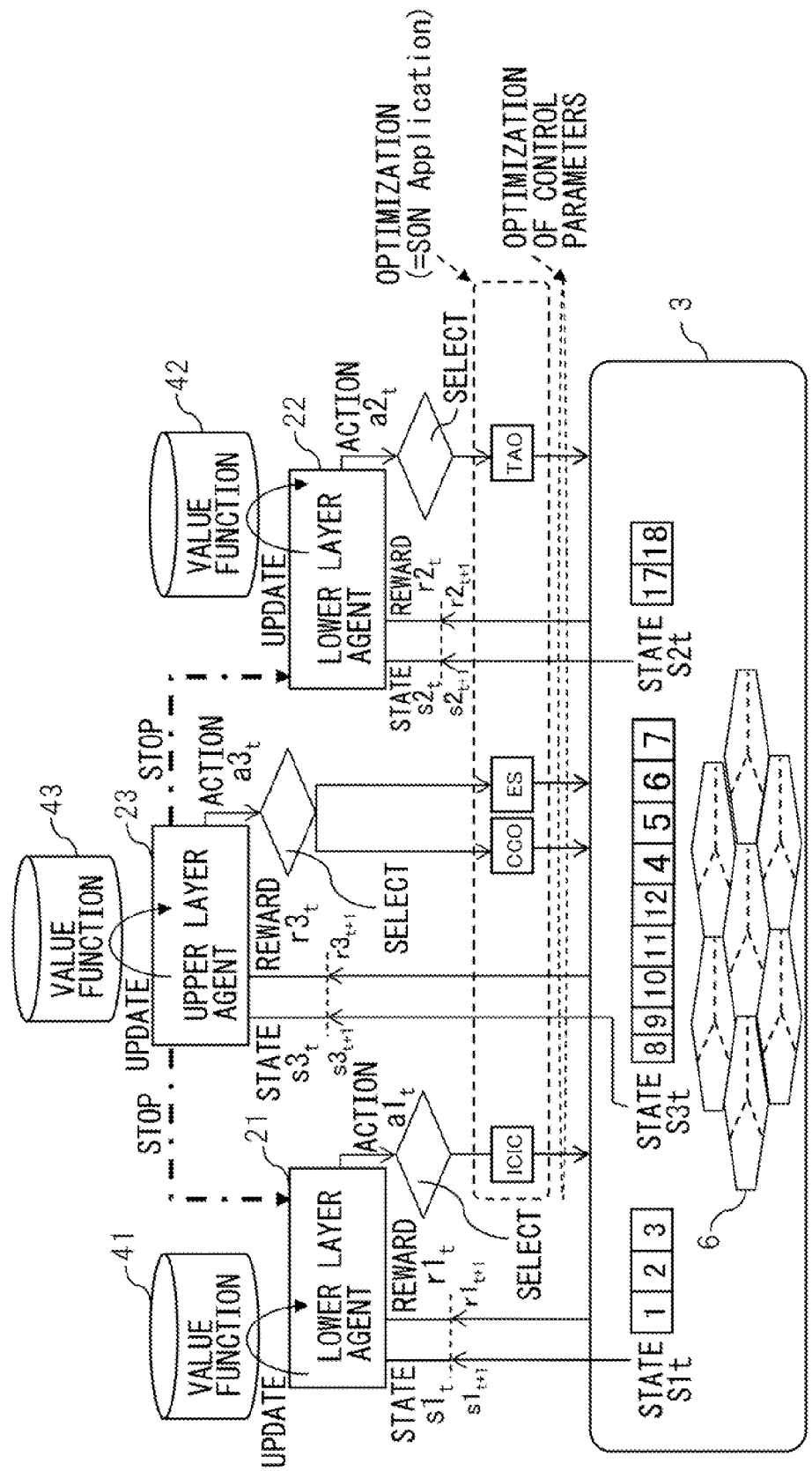
FIG. 11 is a diagram illustrating a fourth embodiment of state variables and optimizations.

Next, another embodiment will be described. FIG. 11 is a diagram of a fourth embodiment illustrating the optimizations selected by the agents 21 to 23. In this embodiment, the optimization that the second lower layer agent 22 selects as the action $a2_t$ is TAO. The second lower layer agent 22 determines whether or not to execute the TAO as the action $a2_t$. The first lower layer agent 21 and the upper layer agent 23 are identical in configuration to those depicted in the first embodiment.

The control parameter to be optimized by the TAO that the second lower layer agent 22 executes does not contend with the control parameter to be optimized by the ICIC optimization that the first lower layer agent 21 executes. Then, between the reinforcement learning process that selects the ICIC optimization as the action and the reinforcement learning process that selects the TAO as the action, the result of the optimization selected in one reinforcement learning process does not affect any reward constituent element used in the other reinforcement learning process. Accordingly, in the present embodiment, the TAO forms a group different from the group formed by the ICIC optimization.

The TAO optimizes paging area formation. A paging area is formed from a plurality of cells, and a mobile station operating in power saving mode transmits a location registration message to the base station whenever it crosses the boundary of the paging area. The mobile station operating in power saving mode saves power by not transmitting a location registration message to the base station when it crosses the boundary of a cell which is much smaller than the paging area. On the other hand, the base station keeps track of the location of the mobile station operating in power saving mode on a paging-area-by-paging-area basis. When an incoming call to the mobile station arrives, every base station located within the paging area where the mobile station has registered transmits a paging message to the mobile station, and the mobile station that received the paging message establishes a call for communication. By optimizing the formation of the paging area, the TAO distributes the cell load associated with the location registration and paging messages and reduces the radio resource usage rate. The control parameter optimized by the TAO is thus the paging area configuration.

The state constituent elements constituting the state $s2_t$ are: (17) frequency of occurrence of location registration message and (18) frequency of occurrence of paging message. The reward constituent element used for the calculation of the reward $r2_t$ is the radio resource usage rate.

On the other hand, the CCO and ES to be executed by the upper layer agent 23 are optimizations that involve varying the cell coverage which is the most fundamental parameter for the state of the mobile network. When the cell coverage is varied, the cell size and hence the paging area size also varies; in this way, the CCO and ES also affect the formation of the paging area.

One example of the expected learning effect expected to be achieved by the reinforcement learning of the second lower layer agent 22 is given below. For example, when the frequency of occurrence of the location registration message in a given paging area is high, the second lower layer agent 22 activates the TAO and varies the boundary of the paging area. As a result, the frequency of occurrence of the location registration message decreases, the radio resource usage rate also decreases, and a higher reward can thus be achieved.

Further, for example, when the frequency of occurrence of the paging message in a given paging area is high, the second lower layer agent 22 activates the TAO and divides the paging area into smaller areas. As a result, the frequency of occurrence of the paging message decreases, the radio resource usage rate also decreases, and a higher reward can thus be achieved.

As can be seen from the above example of the expected learning effect, (17) frequency of occurrence of location registration message and (18) frequency of occurrence of paging message are the state constituent elements necessary for determining whether or not to activate the TAO.

According to the present embodiment, in the reinforcement learning that carries out the TAO, the number of state constituent elements necessary for the reinforcement learning can be reduced since the TAO can be executed independently of other optimizations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A parameter setting apparatus for setting a control parameter for a wireless communication network in response to a state variable of said wireless communication network, comprising:
   a processor which, through reinforcement learning, learns which of a plurality of optimizations, each for optimizing said control parameter, is to be executed to optimize said control parameter, and wherein
   said optimizations form a group of optimizations that affect the same state variable used to determine a value function of reinforcement learning or a group of optimizations whose control parameters overlap each other, and
   said processor executes:
   a process in which a first agent program allocated on a first group of optimizations learns, through reinforcement learning, a first value function for determining which of said optimizations in said first group is to be executed;
   a process in which said first agent program, using said first value function and based on the state of said wireless communication network, determines which of said optimizations in said first group is to be executed as a first optimization, and activates said first optimization;
   a process in which a second agent program allocated on a second group of optimizations learns, through reinforcement learning, a second value function for determining which of said optimizations in said second group is to be executed;
   a process in which said second agent program, using said second value function and based on the state of said wireless communication network, determines which of said optimizations in said second group is to be executed as a second optimization, and activates said second optimization;
   a process in which a third agent program learns, through reinforcement learning, a third value function for determining whether, among said optimizations for optimizing the control parameters of said wireless communication network, an optimization that affects said first and second value functions is to be executed or not;
   a process in which said third agent program, using said third value function and based on the state of said wireless communication network, determines whether said optimization that affects said first and second value functions is to be executed or not and, depending on a result of said determination, activates a third optimization; and
   a process in which, when said third agent program activates said third optimization, the activation of said first and second optimization is stopped.

2. The parameter setting apparatus according to claim 1, wherein said processor further executes:
   a process in which said third agent program sends each of said first and second agent programs an activation stop instruction for instructing said first and second agent programs to stop the activation of said optimization;
   a process in which when said activation stop instruction is received, each of said first and second agent programs sends said third agent program a termination notification notifying said third agent program of termination of said optimization activated by each of said first and second agent program; and
   a process in which said third agent program activates said optimization after receiving said termination notification.

3. The parameter setting apparatus according to claim 1, wherein said optimization activated by at least one of said first and second agent programs concerns the optimization of inter-cell interference.

4. The parameter setting apparatus according to claim 1, wherein said optimization activated by at least one of said first and second agent programs concerns the optimization of base station load.

5. The parameter setting apparatus according to claim 1, wherein said optimization activated by at least one of said first and second agent programs is an optimization that involves varying a handover parameter.

6. The parameter setting apparatus according to claim 1, wherein said optimization activated by at least one of said first and second agent programs concerns the optimization of retransmission control.

7. The parameter setting apparatus according to claim 1, wherein said optimization activated by at least one of said first and second agent program concerns the optimization of paging area formation.

8. The parameter setting apparatus according to claim 1, wherein said optimization activated by said third agent program concerns the optimization of one or more parameters selected from among inter-cell interference, base station load, retransmission control, and paging area formation.

9. The parameter setting apparatus according to claim 1, wherein said first and second groups are formed by grouping together optimizations that affect common state variables among the state variables of said wireless communication network that are used to determine a reward for reinforcement learning.

10. The parameter setting apparatus according to claim 1, wherein said first or second agent program respectively performs the learning of said first or second value function or the selection of the optimization to be executed, by referring, among the state variables of said wireless communication network, to only the state variables used for determining the optimization to be executed by said first or second agent program, and said third agent program performs the learning of said third value function or determines whether said optimization is to be executed or not, by referring, among the state variables of said wireless communication network, to only the state variables used for determining whether or not said optimization is to be executed by said third agent program.

11. A computer-readable, non-transitory medium storing a computer program for setting a control parameter for a wireless communication network in response to a state variable of said wireless communication network, wherein said computer program causes a computer to execute a process which, through reinforcement learning, learns which of a plurality of optimizations, each for optimizing said control parameter, is to be executed to optimize said control parameter, and said optimizations form a group of optimizations that affect the same state variable used to determine a value function of reinforcement learning or a group of optimizations whose control parameters overlap each other, and wherein said computer program causes said computer to execute:

a process in which a first agent program allocated on a first group of optimizations learns, through reinforcement learning, a first value function for determining which of said optimizations in said first group is to be executed;

a process in which said first agent program, using said first value function and based on the state of said wireless communication network, determines which of said optimizations in said first group is to be executed as a first optimization, and activates said first optimization;

a process in which a second agent program allocated on a second group of optimizations learns, through reinforcement learning, a second value function for determining which of said optimizations in said second group is to be executed;

a process in which said second agent program, using said second value function and based on the state of said wireless communication network, determines which of said optimizations in said second group is to be executed as a second optimization, and activates said second optimization;

a process in which a third agent program learns, through reinforcement learning, a third value function for determining whether, among said optimizations for optimizing the control parameters of said wireless communication network, an optimization that affects said first and second value functions is to be executed or not;

a process in which said third agent program, using said third value function and based on the state of said wireless communication network, determines whether said optimization that affects said first and second value functions is to be executed or not and, depending on a result of said determination, activates a third optimization; and a process in which, when said third agent program activates said third optimization, the activation of said first and second optimization is stopped.

12. A parameter setting method for setting a control parameter for a wireless communication network in response to a state variable of said wireless communication network, wherein said parameter setting method organizes a plurality of optimizations, each for optimizing said control parameter, into a group of optimizations that affect the same state variable used to determine a value function of reinforcement learning that is performed to learn which of said plurality of optimizations is to be executed to optimize said control parameter, or into a group of optimizations whose control parameters overlap each other, and said parameter setting method causes a computer to execute:

a process in which a first agent program allocated on a first group of optimizations learns, through reinforcement learning, a first value function for determining which of said optimizations in said first group is to be executed;

a process in which said first agent program, using said first value function and based on the state of said wireless communication network, determines which of said optimizations in said first group is to be executed as a first optimization, and activates said first optimization;

a process in which a second agent program allocated on a second group of optimizations learns, through reinforcement learning, a second value function for determining which of said optimizations in said second group is to be executed;

a process in which said second agent program, using said second value function and based on the state of said wireless communication network, determines which of said optimizations in said second group is to be executed as a second optimization, and activates said second optimization;

a process in which a third agent program learns, through reinforcement learning, a third value function for determining whether, among said optimizations for optimizing the control parameters of said wireless communication network, an optimization that affects said first and second value functions is to be executed or not;

a process in which said third agent program, using said third value function and based on the state of said wireless communication network, determines whether said optimization that affects said first and second value functions is to be executed or not and, depending on a result of said determination, activates a third optimization; and a process in which, when said third agent program activates said third optimization, the activation of said first and second optimization is stopped.

* * * * *

UNITED STATES PATENT AND TRADEMARK OFFICE
CERTIFICATE OF CORRECTION

PATENT NO. : 9,002,757 B2  
APPLICATION NO. : 13/523373  
DATED : April 7, 2015  
INVENTOR(S) : Yuji Kojima Page 1 of 1

It is certified that error appears in the above-identified patent and that said Letters Patent is hereby corrected as shown below:

Title page

Foreign Application Priority Data should be listed as shown below;

-- Item (30)   Foreign Application Priority Data

Jul. 25, 2011   (JP).......................2011-162442 --

Signed and Sealed this  
Fifteenth Day of September, 2015

Michelle K. Lee  
*Director of the United States Patent and Trademark Office*